UNITED STATES PATENT OFFICE.

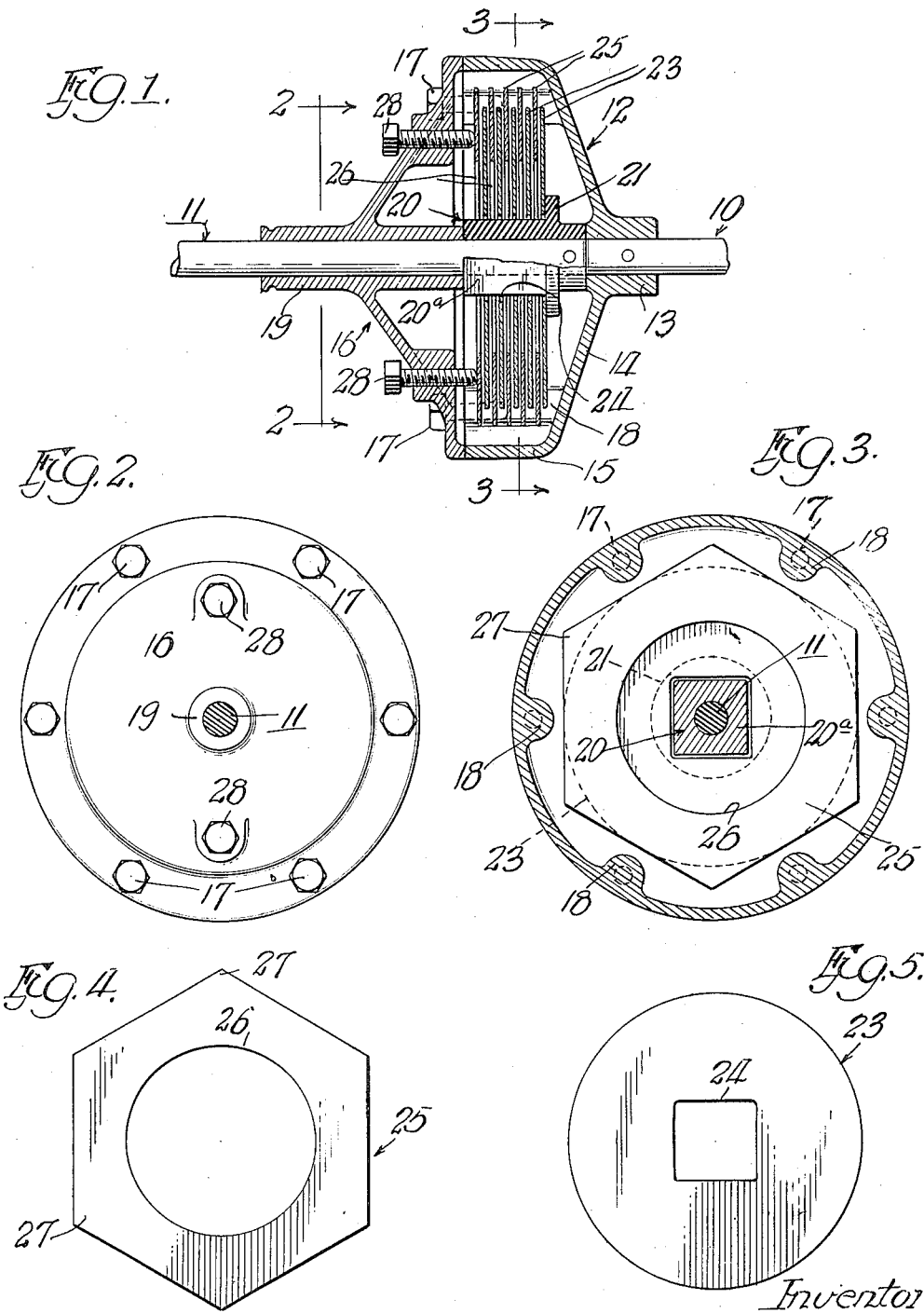

BRUCE CLARK WHITE, OF NEW YORK, N. Y., ASSIGNOR TO FEDERAL ELECTRIC COMPANY, OF CHICAGO, ILLINOIS, A CORPORATION OF ILLINOIS.

FRICTION DRIVE COUPLING.

1,425,305.  Specification of Letters Patent.  Patented Aug. 8, 1922.

Application filed June 3, 1920. Serial No. 386,268.

*To all whom it may concern:*

Be it known that I, BRUCE CLARK WHITE, a citizen of the United States, and a resident of New York city, in the county of New York and State of New York, have invented certain new and useful Improvements in Friction Drive Couplings; and I do hereby declare that the following is a full, clear, and exact description thereof, reference being had to the accompanying drawings, and to the letters of reference marked thereon, which form a part of this specification.

This invention relates to improvements in friction drive couplings and consists of the matters hereinafter described and more particularly pointed out in the appended claims.

The object of the invention is to provide a simple and efficient coupling between a drive shaft and a second shaft driven thereby, which is so constructed that when a load is imposed on the driven shaft, greater than that capable of being driven by the drive shaft, a slippage will occur in the coupling. Such a device is of manifest importance when the drive shaft is the armature shaft of a small electric motor, wherein the overload will act to burn out the motor.

The advantages of the invention will be made more apparent as I proceed with my specification.

In the drawings:

Fig. 1 is a longitudinal, vertical section through a friction drive coupling embodying my invention.

Fig. 2 is a transverse, vertical section through the same, in a plane indicated by the line 2—2 of Fig. 1.

Fig. 3 is another transverse, vertical section through the coupling, in a plane indicated by the line 3—3 of Fig. 1.

Figs. 4 and 5 are views in elevation of friction discs embodied in my improved coupling.

Referring now in detail to that embodiment of my invention illustrated in the accompanying drawings:

10 indicates a drive shaft, and 11 indicates a driven shaft which as shown in this instance, abuts and is in axial alignment with the said drive shaft 10. 12 indicates a cup-like casing, which is fixed to the end of the drive shaft 10 and is open at its other end. Said casing includes a hub or sleeve 13, by means of which it is fixed or pinned to the shaft 10, a flange or wall 14 extending radially from the hub 12 and an annular flange 15 at the outer margin of the wall 14, which overhangs the inner end of the driven shaft 11. 16 indicates a cover fixed to the open end of the casing by means of bolts 17 which are arcuately spaced about the peripheral margin of the cover plate and extend therethrough, to have threaded engagement in inwardly extending bosses 18 on the annular flange 15 of the casing. Said cover includes an elongated central sleeve 19 in which the driven shaft 11 has bearing, the casing and cover providing a substantially fluid-tight enclosing chamber about the inner end of said driven shaft.

20 indicates a sleeve which is fixed to the driven shaft 11 at its inner end, between the hub 13 of the casing and the sleeve 19 of the cover. Said sleeve is rectangular in cross section as shown at 20ª in Figs. 1 and 3 and has a radial flange 21 near that end abutting the hub 13. Non-rotative on said sleeve is a plurality of round discs 23 (see Fig. 5) each having a rectangular hole 24 at its center which fits about the rectangular sleeve 20, the innermost disc engaging against the shoulder provided by the radial flange 21. Between the discs 23 are polygonal discs 25 which as shown, are preferably hexagonal (see Fig. 4). Said discs have a center hole 26 of a diameter greater than that of the sleeve 20, so that it is free to rotate with reference to said sleeve. The discs 25 are of such a diameter across their opposite points 27, which are arranged between the lugs 18 on the annular rim of the casing 12, that they are capable of only a limited rotative movement with reference to the casing and when said points engage said lugs, the discs are then non-rotative with respect to the casing. There are as many polygonal discs 25 as there are discs 23, consequently there will be a polygonal disc 25 at that end of the plurality of discs near the cover 16. Threaded through the cover 16, at diametrically opposite points, are bolts 28, by means of which the discs may be adjusted to the desired close spacing between them. The casing is filled with a heavy lubricant, which of course will also fill the spaces between the discs, in substantially thin layers or films.

Assume that the shaft 10 is the armature shaft of a small electric motor such as used in domestic washing machines and that the shaft 11 is connected up to both the washing and wringing mechanisms of said washing machine. Assume that the shaft 10 is rotating. The casing 12 and cover 16, by reason of being fixed to said shaft, will rotate therewith. With the bolts 28 properly adjusted and the casing filled with lubricant, the discs 25 will, after their corners have engaged the associated bosses 18, rotate with the casing, the viscosity of the lubricant providing the skin friction between the discs 25 and 23, so that said discs 23 will rotate therewith. With the discs rotating, a like movement is imparted to the driven shaft 11, through the sleeve 20, by reason of the engagement of the rectangular holes with said sleeve. Thus the driven shaft will rotate with and is driven by the drive shaft. Assume now that an overload or resistance greater than the driving power of the drive shaft is imposed upon the driven shaft. This will tend to stop the driven shaft and if the same were rigidly connected to the drive shaft, a resistance would be imparted to the motor which would cause the same to burn out. In the improved friction drive coupling herein described, with an overload on the driven shaft, the motor would drive the casing discs 25, while the overload would hold back the shaft 11 and discs 23, a slippage occurring between the discs 23—25, the load caused by the slipping or relative movement between the discs being much less than that at which the motor would burn out.

It is thus apparent that up to a certain load, the drive shaft and driven shaft are rotating in unison, but beyond that load a slippage is provided between said shafts.

With the parts thus enclosed and running in a lubricant, no noise occurs even when the parts are slipping. While the friction of the lubricant between the discs is used as the driving medium between them, it also acts to prevent adhesion or sticking together of the two sets of discs due to frictional heat generated by the relative movement between said discs.

The device contains but a few parts which may be made at a low cost and easily assembled without the necessity of skilled labor. The use of springs which readily get out of order, is entirely eliminated.

While in describing my invention, I have referred to certain details of mechanical construction and arrangement of parts, I do not wish to be limited thereto, except as may be pointed out in the appended claims.

I claim as my invention:—

1. A friction drive coupling comprising, in combination with a drive shaft and a driven shaft in line therewith, a casing fixed to one of said shafts, said casing also providing a bearing in which the other shaft is journaled, a plurality of closely spaced friction discs arranged in said casing concentrically with reference to the common axial line of said shafts, the alternate discs each being polygonal in outline so that the angles thereof will engage with parts of the casing and be rotated thereby, and each having an enlarged central aperture which permits it to move in any direction in its own plane so as to be capable of a floating movement between the other discs which are non-rotative with reference to that shaft having bearing in the casing, and bolts threaded through the casing wall parallel with the shafts for adjusting the spaces between all of said discs.

2. A friction drive coupling comprising, in combination with a drive shaft and a driven shaft in line therewith, a casing fixed to the drive shaft and providing a bearing for the driven shaft, a plurality of closely spaced friction discs arranged in said casing concentrically with reference to the common axial line of said shafts, the alternate discs each being polygonal in outline so that the angles thereof will engage with parts of the casing and be rotated thereby, and each having an enlarged central aperture which permits it to move in any direction in its own plane, so as to be capable of a limited floating movement in a plane at right angles to the driven shaft and also capable of a limited rotative movement with reference to the casing, the other discs being non-rotative with respect to the driven shaft, and means operable from without and extending through the casing and engaging one of the polygonal discs for adjusting the spacing between all the discs, the casing being adapted to contain a lubricant which fills the spaces between the discs.

3. A friction drive coupling comprising, in combination with a drive shaft and a driven shaft in line therewith, a casing secured at one end to the drive shaft and open at the other end, a cover fixed to and closing the casing, said cover having a sleeve in which the driven shaft has bearing, a rectangular sleeve fixed to that end of the driven shaft within the casing, said sleeve including a radial flange, a plurality of closely spaced discs arranged in the casing concentric with the shaft, the alternate discs each being polygonal in outline so that the angles thereof will engage with parts of the casing and be rotated thereby, and each having an enlarged central aperture of a diameter greater than that of the rectangular sleeve so that it may move in any direction in its own plane, the other discs each having a rectangular opening through which the rectangular sleeve extends so that said discs are non-rotative with respect to the driven shaft, the end disc of said last mentioned discs engaging against the radial flange of said sleeve, and bolts extending through the cover and engaging the outermost polygonal disc, said bolts providing for the adjustment of the spacing between all of the discs.

In testimony that I claim the foregoing as my invention, I affix my signature in the presence of two witnesses, this 26th day of May, A. D. 1920.

BRUCE CLARK WHITE.

Witnesses:
ELIAS ISAACS,
MARY A. FOSTER.